(12) United States Patent
Foran et al.

(10) Patent No.: US 12,312,014 B2
(45) Date of Patent: May 27, 2025

(54) COMPOSITE MATERIAL MODULAR UTILITY VEHICLE CONSTRUCT

(71) Applicant: CONTINENTAL STRUCTURAL PLASTICS, INC., Auburn Hills, MI (US)

(72) Inventors: Hugh C. Foran, Auburn Hills, MI (US); Evan Freeman-Gibb, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 357 days.

(21) Appl. No.: 17/916,070

(22) PCT Filed: Mar. 23, 2021

(86) PCT No.: PCT/US2021/023590
§ 371 (c)(1),
(2) Date: Sep. 30, 2022

(87) PCT Pub. No.: WO2021/202157
PCT Pub. Date: Oct. 7, 2021

(65) Prior Publication Data
US 2023/0166798 A1    Jun. 1, 2023

Related U.S. Application Data

(60) Provisional application No. 63/001,700, filed on Mar. 30, 2020.

(51) Int. Cl.
*B62D 25/02*    (2006.01)
*B32B 3/12*    (2006.01)
(Continued)

(52) U.S. Cl.
CPC .............. *B62D 29/001* (2013.01); *B32B 3/12* (2013.01); *B32B 5/02* (2013.01); *B32B 5/18* (2013.01);
(Continued)

(58) Field of Classification Search
USPC ............ 296/193.1, 3, 4, 5, 7, 8, 9, 210, 211, 296/146.8, 106, 50, 901.1
See application file for complete search history.

(56) References Cited

U.S. PATENT DOCUMENTS

2003/0007853 A1   1/2003   Cohn et al.
2010/0101876 A1*  4/2010   Misencik ............... B62D 33/04
                                                   903/902
(Continued)

FOREIGN PATENT DOCUMENTS

CN      205314354 U  *  6/2016
EP      0787643 A1      8/1997
WO      2018140955 A1   8/2018

OTHER PUBLICATIONS

CN205314354 Text (Year: 2016).*
(Continued)

*Primary Examiner* — Dennis H Pedder
(74) *Attorney, Agent, or Firm* — MaxGoLaw PLLC (57) ABSTRACT

A modular utility vehicle construct that is light weight yet robust is provided. The construct is formed with a composite open area core sandwich structure capable of withstanding typical wear and tear and environmental elements experienced by utility vehicle compartments. The use of the composite sandwich structure allows for replacement of traditional materials such as steel or aluminum, without a loss of strength, in a vehicle's containment construct while also reducing the overall weight of the vehicle and increas-
(Continued)

ing the ability to customize the vehicle's utility features to suit the specific needs of the purchaser.

17 Claims, 6 Drawing Sheets

(51) Int. Cl.
| | |
|---|---|
| *B32B 5/02* | (2006.01) |
| *B32B 5/18* | (2006.01) |
| *B32B 5/24* | (2006.01) |
| *B32B 7/12* | (2006.01) |
| *B32B 27/06* | (2006.01) |
| *B32B 27/40* | (2006.01) |
| *B60P 1/43* | (2006.01) |
| *B62D 21/02* | (2006.01) |
| *B62D 25/20* | (2006.01) |
| *B62D 29/00* | (2006.01) |
| *B62D 33/04* | (2006.01) |
| *B62D 33/06* | (2006.01) |
| *C09J 175/04* | (2006.01) |

(52) U.S. Cl.
CPC ............... *B32B 5/245* (2013.01); *B32B 7/12* (2013.01); *B32B 27/065* (2013.01); *B32B 27/40* (2013.01); *B60P 1/431* (2013.01); *B62D 21/02* (2013.01); *B62D 25/2036* (2013.01); *B62D 25/2054* (2013.01); *B62D 33/04* (2013.01); *B62D 33/0604* (2013.01); *C09J 175/04* (2013.01); *B32B 2260/021* (2013.01); *B32B 2260/046* (2013.01); *B32B 2307/102* (2013.01); *B32B 2307/3065* (2013.01); *B32B 2307/732* (2013.01); *B32B 2605/08* (2013.01)

(56) References Cited

U.S. PATENT DOCUMENTS

| | | | |
|---|---|---|---|
| 2011/0254306 A1 | 10/2011 | Nelson | |
| 2012/0177877 A1* | 7/2012 | Lebail | C08K 3/22 |
| | | | 428/116 |
| 2012/0237759 A1 | 9/2012 | Ehbing et al. | |
| 2015/0130105 A1* | 5/2015 | Preisler | B29C 43/18 |
| | | | 264/258 |
| 2017/0210194 A1 | 7/2017 | Ling | |
| 2019/0283361 A1* | 9/2019 | Jia | B32B 5/024 |

OTHER PUBLICATIONS

Int'l Search Report for PCT/US2021/023590, dated Jul. 8, 2021.
Extended European search report for corresponding European Patent Appln. No. 21781332.8, dated Feb. 15, 2024.

* cited by examiner

COMPOSITE MATERIAL MODULAR UTILITY VEHICLE CONSTRUCT

CROSS REFERENCE TO RELATED APPLICATIONS

This application claims priority benefit of U.S. Provisional Application Ser. No. 63/001,700 filed 30 Mar. 2020, the contents of which are hereby incorporated by reference.

FIELD OF THE INVENTION

The present invention in general relates to composite materials and in particular to a modular utility vehicle construct formed with a composite open area core sandwich structure.

BACKGROUND OF THE INVENTION

Weight savings in the automotive, transportation, and logistics based industries has been a major focus in order to make more fuel efficient vehicles. In order to reduce the weight of such vehicles, light weight composite materials have been introduced to take the place of typical metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials.

A sandwich-structured composite is a special class of composite material that is fabricated by attaching two thin but stiff skins to a lightweight but thick core. The core material is normally a low strength material, but its higher thickness provides the sandwich composite with high bending stiffness with overall low density. While sandwich structures have previously been developed to provide strength and reduced weight, the ability to obtain a vehicle exterior quality high gloss surface has remained a challenge, regardless of whether the surface outermost layer is thermoset resin or thermoplastic. Exemplary of these efforts are U.S. Pat. Nos. 5,087,500A, 4,803,108A, 8,091,286B2, 4,369,608A, 3,553,054A, and WO2018/202473. It is conventional to either not use such structures in settings where vehicle high gloss surfaces are required or resort to an additional outer layer to provide a high gloss outermost layer. Such outermost layers can be applied after structure production or through in mold coatings, both of which add to the cost and complexity of production.

Still another conventional problem with sandwich structures is that the edges are ineffective and allow for infiltration of humidity or moisture that becomes entrained within the core and often inconsistent with finished vehicle surface requirements. With temperature extremes this entrained moisture can reduce the operational lifetime of the structure, while increasing the weight thereof. These problems of moisture infiltration are particularly pronounced in instances when the core is formed of cellulosic materials such as paper. Accordingly, such composite structures have been unsuitable for forming exterior walls of vehicles given that such areas of a vehicle are openly exposed to the elements.

Utility vehicles are a class of vehicle for which replacement of typical metal structural and surface body components and panels with light weight composite materials has proven difficult. This is due in part to the rigorous conditions under which such vehicle are used, the variety of tasks such vehicle must be equipped for, and the versatility required of such vehicles.

Thus, there exists a need for a light weight yet robust modular utility vehicle construct capable of withstanding typical wear and tear and environmental elements experienced by utility vehicle compartments.

SUMMARY OF THE INVENTION

A modular utility vehicle is provided that includes a chassis having a front portion and a rear portion, and an operator cab fixed to the front portion of the chassis. The modular utility vehicle has a plurality of modular panels formed of a composite sandwich material having an open area core defining a plurality of pores, a surface sheet adhered to a first face of the open area core by a first adhesive layer, and a structural skin adhered to a second face of the open area core by a second adhesive layer, the plurality of modular panels forming a containment construct that is fixed to the rear portion of the chassis.

BRIEF DESCRIPTION OF THE DRAWINGS

The present invention is further detailed with respect to the following drawings that are intended to show certain aspects of the present invention but should not be construed as a limit on the practice of the present invention.

DESCRIPTION OF THE INVENTION

The present invention has utility as a light weight yet robust modular utility vehicle construct formed with a composite open area core sandwich structure capable of withstanding typical wear and tear and environmental elements experienced by utility vehicle compartments. The use of the composite sandwich structure allows for replacement of traditional materials such as steel or aluminum, without a loss of strength, in a vehicle's containment construct while also reducing the overall weight of the vehicle and increasing the ability to customize the vehicle's utility features to suit the specific needs of the purchaser.

According to embodiments, components for forming a modular utility vehicle construct are formed of a sandwich composite structure as detailed in U.S. Provisional Patent Application No. 62/774,600, filed on Dec. 3, 2018, the contents of which are hereby incorporated by reference. As described therein, embodiments of the sandwich composite structure provide a high gloss surface sheet and structural skin that are adhered to the open area core with an adhesive or glue that is viscous when applied. The viscosity of the adhesive as applied allows for contact with the interior volume of the open area core to create more adhesion surface area yet without excessively running into the pores defined in the open area core before the adhesive cured or hardens thereby providing greater adhered contact area between the components of the sandwich composite structure. As a result, reduced delamination of the components of the sandwich composite structure is observed as well as precluding bond line readthrough into the high gloss surface sheet. It is appreciated that providing a high gloss exterior surface without resort to an additional outmost layer requires a balancing of opposing surface tension properties of the composite sandwich panel structures to avoid a loss in tolerances associated with bowing of the structure. Thus, forming components for forming a modular utility vehicle construct out of such a composite sandwich structure also have utility as watertight and waterproof composite sandwich panel structures.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

As used herein, the term "high gloss surface" refers to a surface having minimal perceptible surface defects when visually inspected for about three seconds from about 24-28 inches from the viewer and normal to the part surface+/−90 degrees in a well-lit area. That is, the term "high gloss surface" refers to a surface capable of being painted and accepted as a "Class A" autobody part. This is commonly measured by ASTM D523. In the automotive industry, a Class A surface is a surface a consumer can see without functioning the vehicle (e.g., opening the hood or decklid), while a Class A surface finish generally refers to painted outer panels and specifically to the distinctness of image (DOI) and gloss level on the part. It is appreciated that a surface layer may be subjected to sanding, trimming, and priming prior to receiving a paint coating that imparts high gloss, yet must retain dimensionality and adhesion uniformity to primer and paint so as to achieve a high gloss finish.

Figure 1:
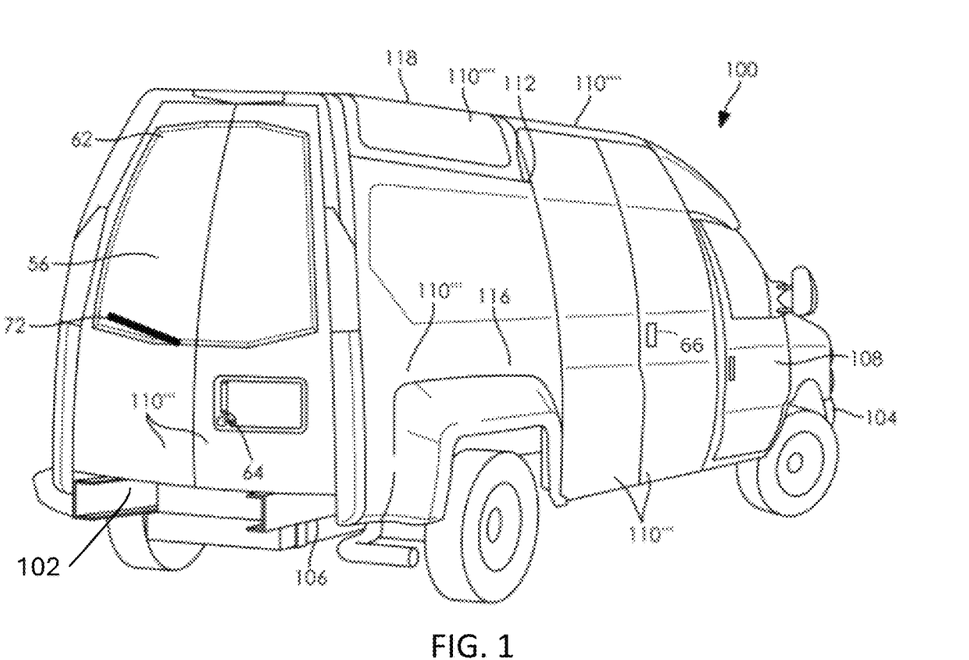
FIG. 1 shows a perspective view of an inventive modular utility vehicle according to embodiments of the present invention.
Figure 2:
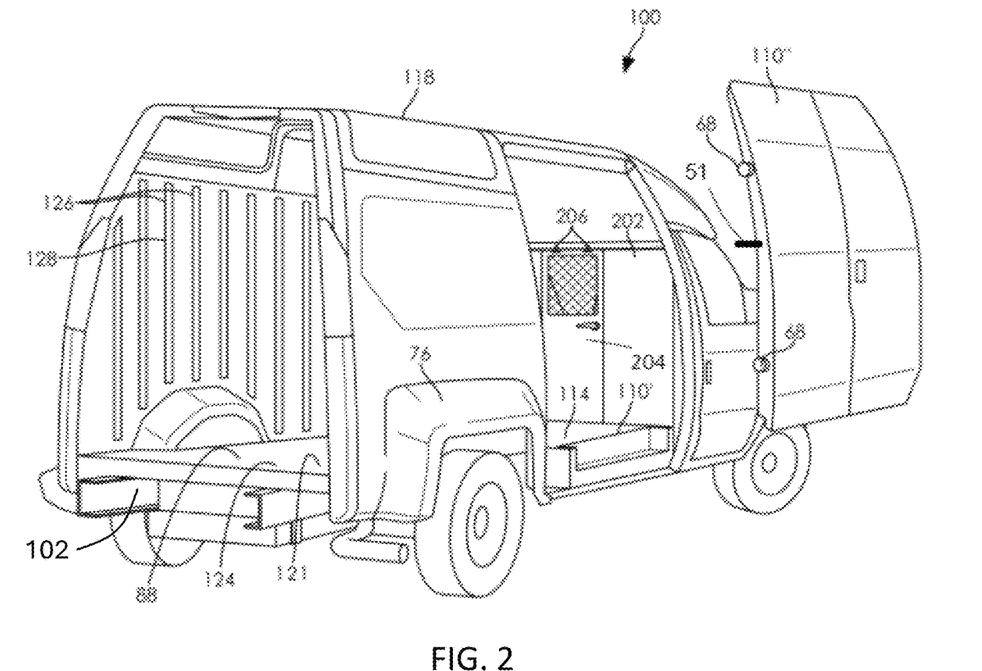
FIG. 2 shows a perspective view of an inventive modular utility vehicle according to embodiments of the present invention with door panels removed.
Figure 3:
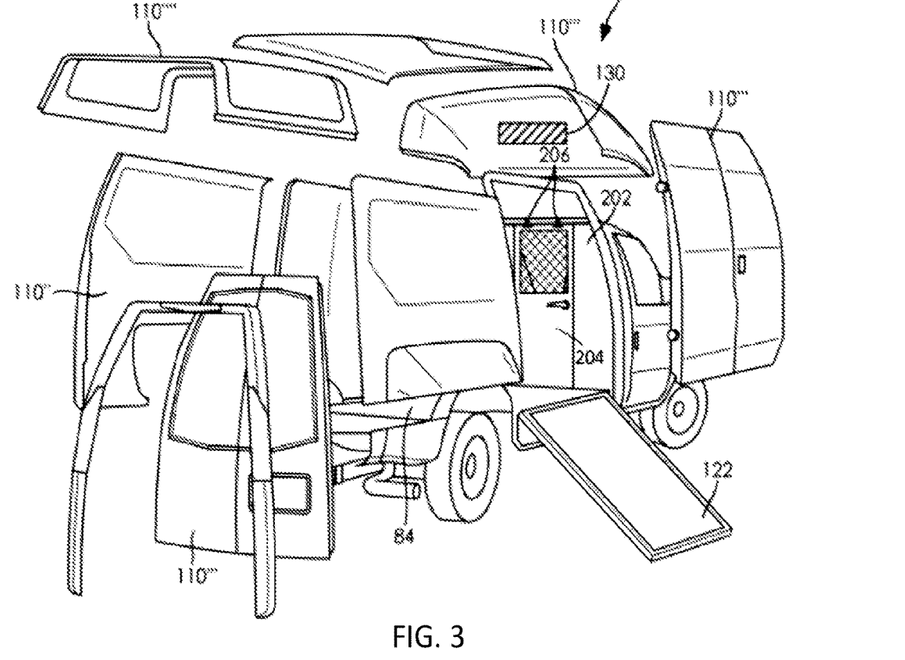
FIG. 3 shows an exploded perspective view of an inventive modular utility vehicle according to embodiments of the present invention.

FIGS. 1-3 show a rear perspective view of a modular utility vehicle 100 according to embodiments of the present invention. According to embodiments, a modular utility vehicle 100 includes a chassis 102 having a front portion 104 and a rear portion 106, an operator cab 108 fixed to the front portion 104 of the chassis 102, and a plurality of modular panels 110 formed of a composite sandwich material 10, such as that shown in FIGS. 4-7. The composite sandwich panel material 10 includes an open area core 12 with walls 26 defining an ordered array of pores 24 terminating in faces 17 and 17', a surface sheet 14 adhered to a first face 17 of the open area core 12 by a first adhesive layer 20, and a structural skin 16 adhered to a second face 17' of the open area core 12 by a second adhesive layer 22. The plurality of modular panels 110 together form a containment construct 112 that is fixed to the rear portion 106 of the chassis 102. According to embodiments the containment construct 112 includes a floor assembly 114, a wall assembly 116, and a roof assembly 118, each of the floor assembly 114, wall assembly 116, and roof assembly begin formed of at least one of the panels of the plurality of modular panels 110.

In some inventive embodiments, a partition 202 is present between the operator cab 108 and the rear portion 106. It is appreciated that the partition provides a safety function by protecting inhabitants of the operator cab 108 from contents of the rear portion 106 shifting forward during a sudden a stop or collision. The partition 202 is readily formed from materials illustratively including composite sandwich material 10 as detailed hereafter, sheet metal, sheet molding composition, or combinations thereof. In some inventive embodiments, the partition 202 include a door 204 to access the rear portion 106 from the operator cab 108. The door is readily made of any of the materials from which the partition 202 is made. The door 204 is movably attached to the partition 202 with hardware 206 as hinged door, roller door, pocket door, or sliding door.

Figure 4:
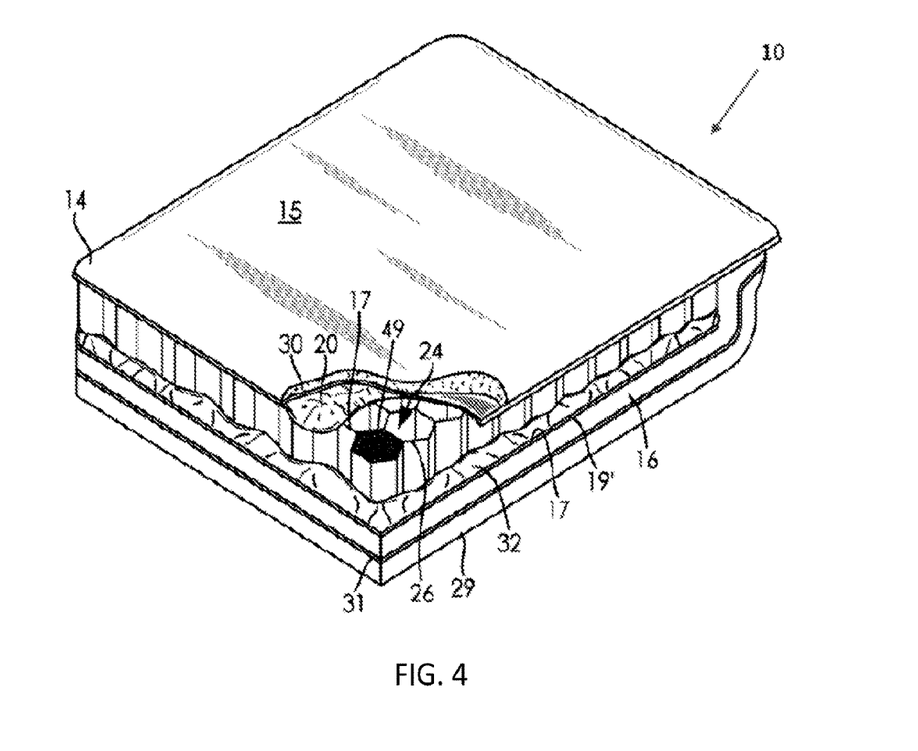
FIG. 4 is a partial cutaway, perspective view of a composite sandwich panel material used to form embodiments of the inventive cargo construct.
Figure 5:
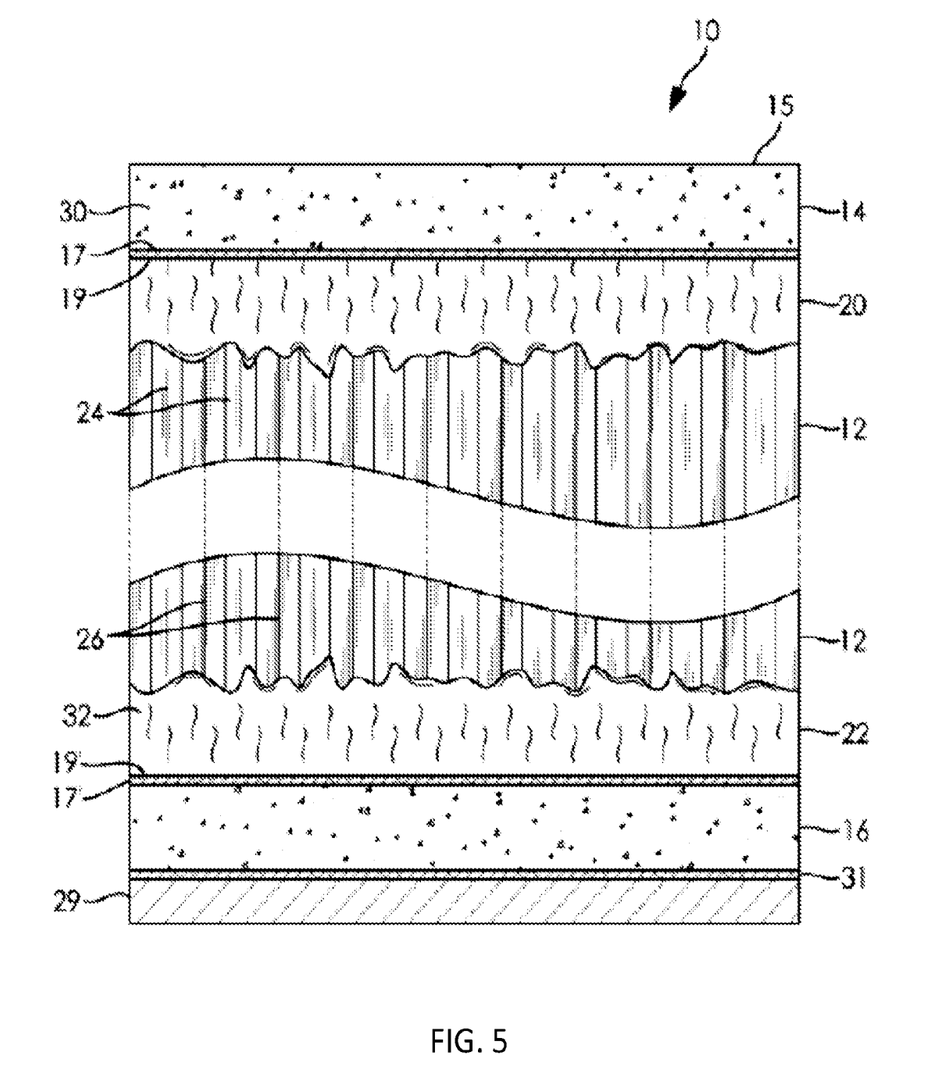
FIG. 5 is an enlarged partial cutaway, side view of the composite sandwich panel material of FIG. 4 along a line bisecting the hexagonal pores.

FIGS. 4-7 show a composite sandwich material 10 from which the plurality of modular panels 110 are formed. As shown in FIG. 4, a portion of the surface sheet 14 is cutaway to reveal the adhesive 20, a cloth, if present; and the open area core 12. The surface sheet 14 is adhered to a first side of the open area core 12 by a first adhesive layer 20. According to embodiments, the surface sheet 14 presents an outwardly facing high gloss surface 15. FIG. 5 is an enlarged cross-sectional view of a composite sandwich panel material 10 used to form modular panels 110 that are assembled into the inventive modular utility vehicle 100 according to embodiments of the invention. FIG. 5 shows further details of the various layers making up the composite sandwich material 10. In some embodiments, a cloth 19 is present intermediate between the face 17 of the open area core 12 and the surface sheet 14, the cloth 19 being embedded within the adhesive 20. The structural skin 16 is adhered to an opposing second side of the open area core 12 by a second adhesive layer 22. In some embodiments, a cloth 19' is present intermediate between the face 17' of open area core 12 and the structural skin 16, the cloth 19' being embedded within the adhesive 22.

According to embodiments, the open area core 12 is formed of a lightweight material that defines a plurality of pores 24 so as to reduce the overall density of the open area core 12. The open area core 12 is formed from a variety of materials that include cellulosics such as corrugated fiberboard, paper board, paper stock; thermoplastics such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; thermosets such as polyesters, polyureas, polyurethanes, polyurea/polyurethanes, epoxies, vinyl esters; metal such as aluminum, magnesium, and alloys of any one of the aforementioned where at least one of the aforementioned metals constitutes the majority by weight of the alloy; a foam formed from polyurethane, polyethylene, ethylene vinyl acetate, polypropylene, polystyrene, polyvinyl chloride, or aerogels, regardless of whether the foam is open-celled or closed-celled. The top edges of the walls 26 that define the pores 24 in certain embodiments of the open area core such as 12 form an array of various shapes, such as hexagonal, circular, rhomboidal, triangular, parallelogram quadrilateral, and regular quadrilateral, honeycombs, diamonds, squares, triangles, parallelograms, circles, or a combination thereof. In some embodiments, the ratio of the thickness of a wall 26 to the maximal linear extent between faces 17 and 17' is between 0.01-10:1. A wall thickness ranges from 0.1 mm to 100 mm in such embodiments.

The adhesive layers 20, 22 are formed of either a thermoplastic or curable formulation, a polyurethane or polyurethane prepolymer adhesive, which may be in the form of glue, a moisture cure adhesive, a reactive hot melt adhesive, or a polyurethane resin. As shown in FIG. 5, due to the compressive force applied to the adhesive layers 20, 22 between the surface sheet 14 and the open area core 12 and the structural skin 16 and the open area core 12, the adhesive 20, 22 is engineered to have an initial viscosity on contact with the face 17 and the walls 26 so as partially fill the pores 24 of the open area core 12. The viscosity of the adhesive layers 20, 22 ensures that the adhesive does not excessively run into the pores defined in the open area core before the adhesive attains final strength. Accordingly, the adhesive surface area for adhesion between a surface sheet and structural skin and the open area core is at least 5% more than surface area of the walls at the face. This increased surface area of adhesion reduces delamination of the components of the composite sandwich 10 and surprisingly allows for the use of thinner surface sheets that do not exhibit bond line read through. As a result of increasing the adhesive surface area coverage from 10 to 50 surface areas percent allows for the comparatively expensive high gloss surface sheet to be reduced in thickness from 1.5 mm to between 1.3 and 0.8 mm while still preventing of bond line read through.

The surface sheet 14 of the composite sandwich material 10 is formed from sheet molding compound (SMC), thermoplastic, dicyclopentadiene (DCPD), overmolded polyurethane (PU), or a combination thereof. According to embodiments, the surface sheet 14 is a high gloss surface sheet having a high gloss surface 15. The surface sheet 14 can include a filler material 30 to reinforce and/or serve to decrease the weight of the high gloss surface sheet 14. The filler material 30 is any of glass fibers, carbon fibers, natural fibers, hollow or solid glass microspheres, or a combination thereof. The fibers may be oriented or non-oriented. In some inventive embodiments in which SMC forms the high gloss surface, a resin package sold by Continental Structural Plastics, Inc. under the tradenames TCA® and TCA® ULTRA-LITE™ are used herein. Exemplary formulations of which are detailed in U.S. Pat. No. 7,700,670, WO2017/184761, and U.S. Pat. No. 7,524,547B2. It is appreciated that the high gloss sheet routinely includes additives to retain dimensionality. Such additives routinely including glass fiber; carbon fiber; inorganic particulate fillers such as calcium carbonate, talc, and carbon black; glass microspheres; carbon nanotubes; graphene; low profile additives; moisture scavengers; and combinations thereof. Typical thicknesses of the high gloss surface sheet in the present invention range from 0.5 to 5 millimeters (mm) without regard to edges.

As will be understood by a person having ordinary skill in the art, the high gloss surface sheet tends to be a comparatively dense component and an expensive portion to manufacture given the materials used and necessary forming processes to maintain minimal perceptible surface defects suitable for a Class A autobody part. To reduce costs and weight of the composite sandwich panel material 10, it is accordingly desirable to reduce the thickness of the high gloss surface sheet 14, making it as thin as possible. It will also be understood that as the thickness of the high gloss surface sheet 14 is decreased the high gloss surface sheet 14 tends to deform when supported by limited portions of the face 17 above the open area core 12. While result to a large contact surface area of the first adhesive layer 20 is advantageous, in some inventive embodiments a cloth 19 is embedded in the first adhesive layer 20.

The structural skin 16 is adhered to the second side of the open area core 12 by the second adhesive layer 22. The structural skin 16 is formed of a fiber mat having non-oriented, non-woven fibers, unidirectional, or woven fibers, a thermoplastic sheet, or an SMC. The structural skin 16 provides a robust and durable surface. In some embodiments, the structural skin 16 terminates against the backside of the surface sheet 14 to encapsulate the open area core 12.

According to certain embodiments, the composite sandwich material 10 provides sound damping, fire retardancy, thermal insulation, or a combination thereof by placing a sound and/or heat absorbing material within the pores 24 of the open area core 12. According to embodiments, the pores 24 of the open area core 12 are at least partially filled with a fill 49. The fill illustratively including foam pellets, fire retardant, or a phase change material. Phase change materials operative herein include waxes or an inorganic salt hydrates.

The surface sheet 14 and the structural skin 16 are joined together along an edge 33A-33D of the composite sandwich material 10 to form a seal, as shown in FIGS. 6A-6D, respectively. In certain embodiments in which all of the edges of the composite sandwich material assembly 10 are sealed, the open area core 12 is fully enclosed and moisture is inhibited from entering the interior of the composite sandwich material assembly 10. Given that the components of the inventive containment construct 112 formed of the composite sandwich material assembly 10 are exposed to natural elements including sun, snow, humidity, and rain, preventing moisture from entering the interior of the composite sandwich material 10 is important given that freeze thaw cycles of moisture within the part cause expansion and potentially failure of the composite sandwich material 10, leading to damage to the vehicle containment construct 112. Additionally, in embodiments in which the open area core 12 is formed of a hydrophilic material such as paper, moisture within the composite sandwich material assembly 10 would destroy the open are core 12 and cause the part to fail.

FIGS. 6A-6D show various embodiments of ways in which the surface sheet 14 and the structural skin 16 are joined together to form a sealed edge 33A-33D, respectively according to the present disclosure. In some inventive embodiments an elastomeric gasket 34 is disposed between the surface sheet 14 and the structural skin 16 at the 33C to make the edge 33C more water resistant. It is appreciated that a gasket is readily included in the other edge joiner 33A, 33B, and 33D. The gasket 34 enhances maintenance of the edge seal over a wider range of use conditions.

As will be understood by one having ordinary skill in the art, to form an edge seal between the surface sheet 14 and the structural skin 16, at least one of the surface sheet 14 and the structural skin 16 requires enough material to wrap around the edge of the composite sandwich 10. According to embodiments, at least one of the surface sheet 14 and the structural skin 16 is provided in dimensions greater than the dimensions of the final composite part such that the material is able to wrap around the final edge composite sandwich 10. According to certain embodiments, the at least one of the surface sheet 14 and the structural skin 16 is preformed such that it has edges extending generally perpendicularly from the plane of the sheet material.

Figure 6A:
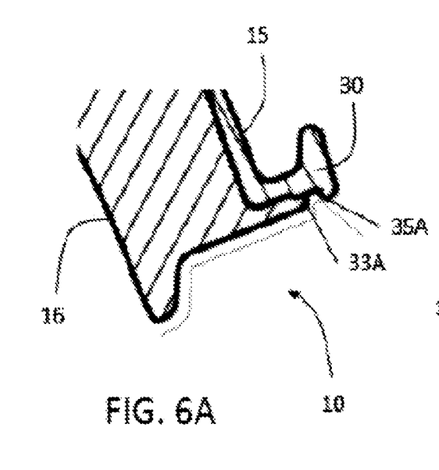
FIGS. 6A-6D are cross-sectional views of edges of a composite sandwich panel material.
Figure 6B:
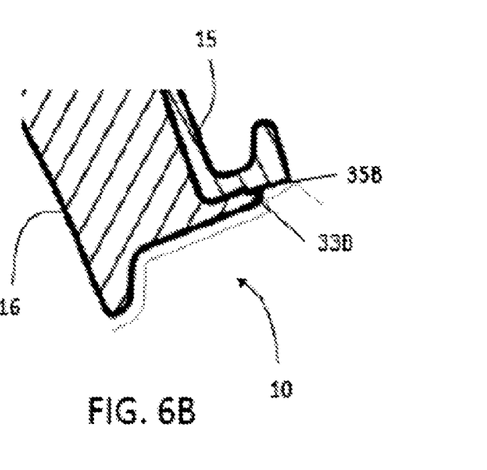
Figure 6C:
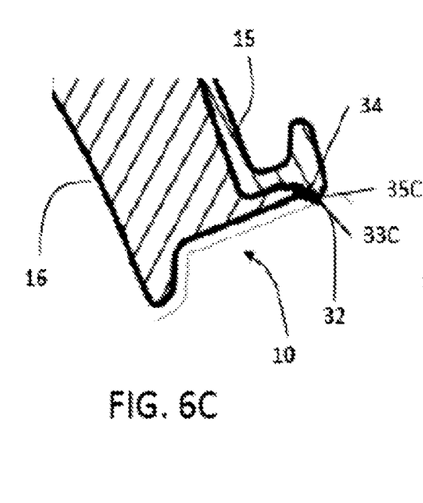
Figure 6D:
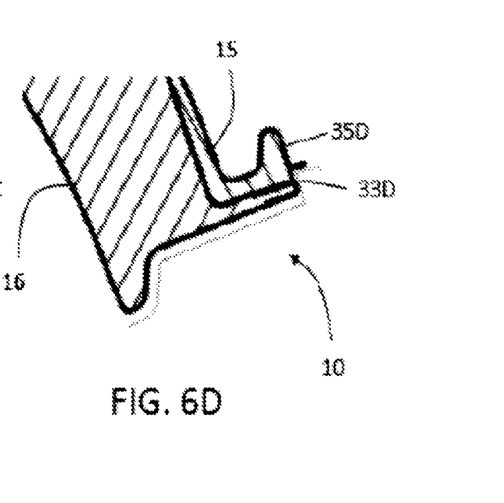

According to embodiments, excess material is cut from the composite sandwich once the edge seal is formed. As shown in FIG. 6A, excess material of the structural skin 16 has been trimmed from the composite sandwich assembly 10 by a knife or router that presses against the divot 35A that is formed by the surface sheet 14. In FIG. 6B, the edge 33B formed by removing excess material for tool engagement against a shoulder 35B of the surface sheet 14. In FIG. 6C, the edge 33C formed by removing excess material for tool engagement against a shoulder 35C of the surface sheet 14. Also, as shown in FIG. 6D, excess material of one or both the surface sheet 14 and the structural skin 16 are trimmed with tool pressure against shoulder 35D.

Figure 7:
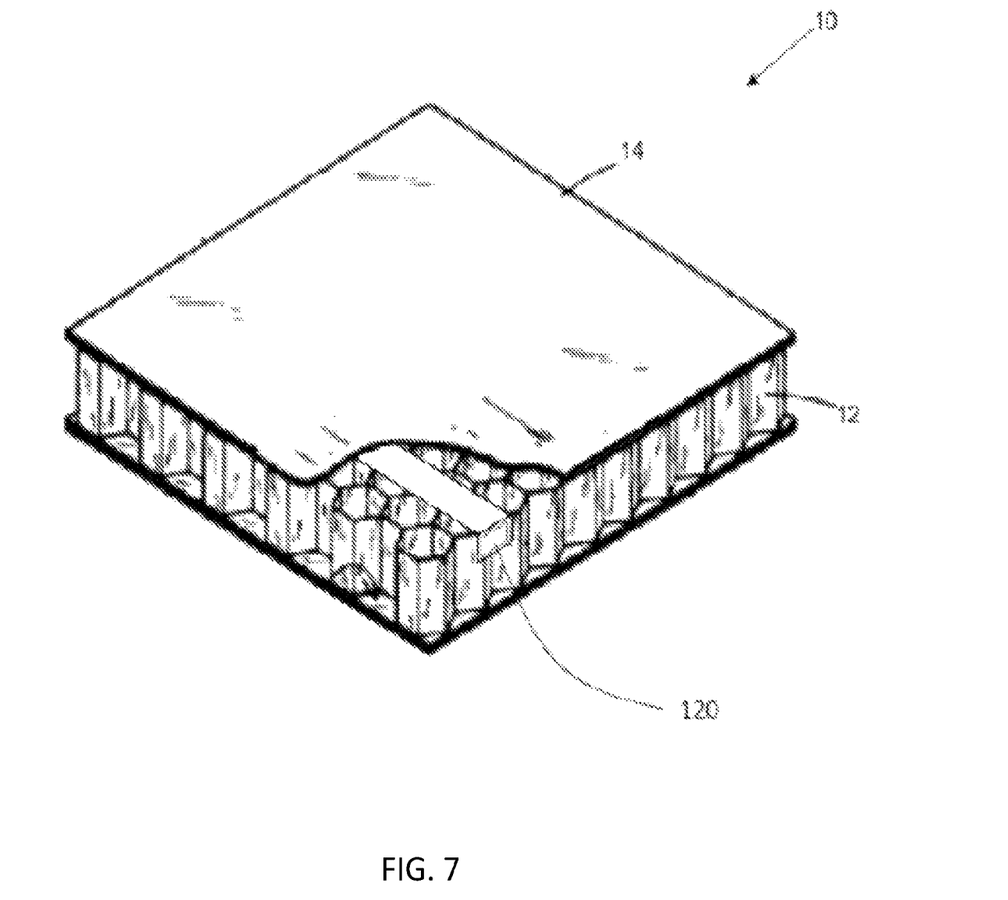
FIG. 7 is a partial cutaway, perspective view of a composite sandwich panel material having a conduit used to form embodiments of the inventive component construct.

As shown in FIG. 7, embodiments of an inventive vehicle containment construct 112 include a conduit system 120 embedded within the composite sandwich material 10 of the vehicle component. As shown in FIG. 7, the conduit system 120 is embedded in the open area core 12 of composite sandwich panel assembly 10 that forms the vehicle cargo construct 112. According to embodiments, the conduit system 120 comprises tubing or wires that are molded into the open area core 12 of the composite sandwich 10 before the vehicle component is formed. According to embodiments, the conduit system 120 includes electrical wiring, ventilation ducts, or heating elements. Accordingly, embodiments of the containment construct 112 of the inventive modular utility vehicle 100 are capable of including features such as speakers, lights, air vents, and defrosting elements for removing ice or snow present on the vehicle cargo construct 112. The conduit systems 120 of various vehicle components are configured to align with one another to form a single connected conduit system throughout the vehicle to connect electrical wiring, ventilation ducts, and/or heating elements of each of an inventive vehicle cargo construct with like electrical wiring, ventilation ducts, and/or heating elements of the vehicle to function.

As described above, FIGS. 1-3 show a rear perspective view of a modular utility vehicle 100 according to embodiments of the present disclosure. The modular utility vehicle 100 includes a plurality of modular panels 110 formed of the composite sandwich material 10 described above. The plurality of modular panels 110 together form a containment construct 112 that is fixed to the rear portion 106 of the chassis 102 and may abut the operator cab 108 at the front portion of the chassis 102. According to embodiments the containment construct 112 includes a floor assembly 114, a wall assembly 116, and a roof assembly 118, each of the floor assembly 114, wall assembly 116, and roof assembly begin formed of at least one of the panels of the plurality of modular panels 110.

Figure 8:
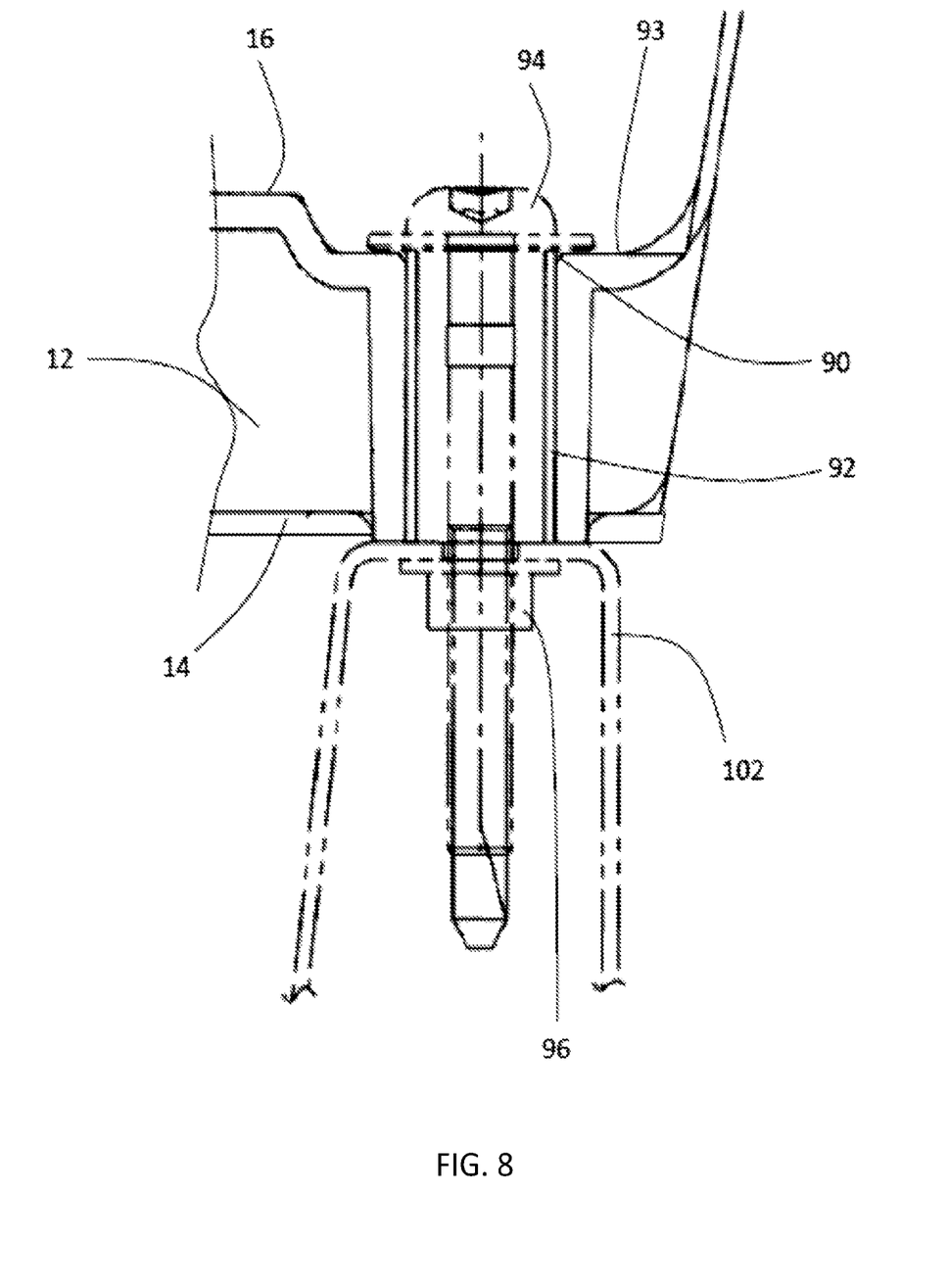
FIG. 8 is a cross sectional view of a hard point used to join portions of the modular utility vehicle according to embodiments of the present invention.

According to embodiments, the floor assembly 114 includes at least one floor panel 110' of the plurality of modular panels 110 positioned horizontally along the chassis 102. Generally, the floor surface within the interior of the containment construct 112 is defined by the structural skin 16 of the composite sandwich material 10 that forms the floor panel 110'. According to embodiments, the floor assembly 114 is attached to the chassis 102 using a plurality of fasteners. According to embodiments, the floor panel 110' includes a plurality of hard points 90, as shown in FIG. 8. The hard points 90 are configured to be points at which the vehicle cargo construct 112 is attached to the vehicle frame or chassis 102. According to embodiments, the hard points 90 are through holes defined in the composite sandwich material 10 that forms the vehicle cargo construct 112. According to embodiments, a fastener, such as a bolt 94, is inserted through the hard point 90 and through an opening defined in the vehicle frame 102, securing the vehicle containment construct 112 to the vehicle frame 102 using a nut 96. According to embodiments, the hard points 90 are formed in mounting recesses 93 that are formed in the structural skin 16 surface of the composite sandwich material 10, thus allowing the head of the fastener 94 to be recesses into the mounting recess 93 so that the head of the fastener 94 is flush with the surface of the cargo compartment that is defined by the structural skin 16 of the composite sandwich material 10. According to embodiments, the hard points 90 include a collar 92 disposed within the through hole that forms the hard point 90. The collar 92 may be inserted into the through hole defined by the composite sandwich panel material 10 after the through hole is formed in the composite sandwich material 10 or the collar 92 may be pre-positioned and the composite sandwich material 10 formed around the collars 92.

According to embodiments, the floor assembly 114 includes a plurality of tie down points 121. The tie down points 121 are positioned on and formed in the floor panel 110' on the side that is positioned on the interior side of the containment construct 112. The tie down points 121 provide hard points to which equipment may be tied or strapped for secured transport within the modular utility vehicle 100. According to embodiments, the floor assembly 114 includes a track system 124. The track system 124 is formed in the floor panel 110' to allow equipment to be slidably secured into the track system 124. That is, equipment with a foot or foot attachment that corresponds to the shape of the track system 124, for example a T-shape, may be slidably secured into the track system 124 such that the equipment is prevented from uncontrollably sliding around the containment construct 112, for example when the utility vehicle 100 is underway, but the track system 124 allows the associated equipment to be controllable moved within the track system 124 in the event a user needs to move a piece of equipment within the containment construct 112. According to embodiments, the floor assembly 114 includes an extendable ramp 122, which according to embodiments is formed of the same composite sandwich material 10 as the plurality of modular panels. The extendable ramp 122 is useful for moving heavy objects into and out of the contained volume defined by the containment construct 112 of the modular utility vehicle 100. The extendable ramp 122 either slides out from the floor panel 110' on a pair of rails or folds out via the ramp's hinged connection to the floor panel 110'. According to embodiments, the extendable ramp 122 is actuated by any of manual operation or electronic control.

According to embodiments, a bed liner 84 is positioned on the upper surface of the floor panel 110' of the containment construct 112. According to embodiments, the bed liner 84 is formed of the composite sandwich material 10. According to embodiments, the bed liner 84 is removable from the cargo construct 112 such that the bed liner 84 may be removed, easily washed, or replaced, thus protecting the floor panel 110'.

According to embodiments, the wall assembly 116 of the containment construct 112 of the modular utility vehicle 100 includes a plurality of wall panels 110" of the plurality of modular panels. The wall assembly 116 is positioned perpendicularly to the chassis 102 and perpendicularly to the floor assembly 114. The plurality of wall panels 110" of the wall assembly 116 may be formed of a single piece of composite sandwich material 10 or may be formed of several separate panels of composite sandwich material 10 that are joined together to form the wall assembly 116. The wall panels 110" may be joined together using ordinary fasteners or the hard points 90 as shown in FIG. 8. According to embodiments, any of the wall panels 110" are formed of a double wall of composite sandwich material 10. In such embodiments, a void may be formed between the two walls of composite sandwich material 10. Within such a void, at least one compartment for housing various items is formed. The compartment may have a locking door formed in either one or both of the surrounding walls of composite sandwich panel material 10.

According to embodiments, the wall assembly 116 additionally includes a plurality of wheel wells 76 each having an interior surface and an exterior surface. Each of the wheel wells 76 configured to receive a wheel of the vehicle on the side of the exterior surface of the wheel well 76 and partially surround the wheel of the vehicle. According to embodiments, the plurality of wheel wells 76 are defined by and are integrally formed with each of the side wall panels 110". Alternatively, the wheel wells 76 are structures formed separately from the side wall panels 110". Each of the wheel wells 76 is positioned between one of the side wall panels 110" and the floor panel 110'.

According to embodiments, a wall panel 110" of the wall assembly 116 includes a window 56 formed therein. The window 56 is disposed in a through opening 62 that is defined in the wall panel 110". The through hole 62 extends from a first exterior surface of the wall panel 110" to an interior surface of the wall panel 110". The window 56 is formed of a transparent material, such as a transparent resin or glass. According to embodiments, the window 56 is formed by injection molding. In such embodiments, a transparent resin that forms the window 56 is injected into a mold, preferably the same mold that is used to form the shape of the wall panel 11". Thus, the panel 110" is capable of being formed as a single unit from a single mold or manufacturing device. This presents significant time and monetary savings for manufacturers.

According to embodiments, the transparent resin of the window 56 is a thermoplastic resin having high impact resistance and toughness, such as acrylonitrile butadiene styrene (ABS). Additionally, the window 56 formed by a resin is significantly lighter in weight than a typical glass window, thereby significantly reducing the weight of the vehicle component construct. According to embodiments, the ABS resin includes from 15 to 35% acrylonitrile, 5 to 30% butadiene, and 40 to 60% styrene. Components formed from ABS resin have high impact resistance and toughness, making ABS particularly well suited for forming a vehicle window. The transparent resin can be tuned to improve impact resistance, toughness, and heat resistance. For example, impact resistance can be amplified by increasing the proportions of polybutadiene in relation to styrene and also acrylonitrile, although this causes changes in other properties. Impact resistance does not fall off rapidly at lower temperatures. The transparent resin can be further tuned by modifying the conditions under which the material is processed to the final product. For example, molding at a high temperature improves the gloss and heat resistance of the product whereas the highest impact resistance and strength are obtained by molding at low temperature. Fibers (usually glass fibers) and additives can be mixed in the resin pellets to make the final product strong and raise the maximum operating temperature as high as 80° C. (176° F.). According to embodiments, particles are added to the transparent resin such that the window 56 is tinted to provide UV protection within the vehicle. According to embodiments, additives are provided in the transparent resin to increase the window's 56 ability to withstand the harmful effects of ultraviolet radiation.

According to embodiments, the window 56 is formed of glass. In such embodiments, a glass window 56 may be positioned in such a way that the wall panel 110" is molded around the glass window 56. Alternatively, the glass window 56 is bonded to a lip that surrounds the through opening 62 formed in the wall panel 110".

According to embodiments, the window 56, formed of either glass or a transparent resin, includes window defroster elements that are molded into the window 56. According to embodiments, the window defroster elements are a plurality of wires that are configured to be electrically heated such that any frost, fog, or ice that forms on the window 56 can be removed by the heating of the wires. According to embodiments, the window defroster elements of the window 56 include a connector that is positioned outside of the window 56. The connector is configured to be connected with a corresponding connector positioned on the wall panel 110".

According to embodiments, a wall panel 110" or a door panel 110''' having a window 56 includes a wiper blade 72 pivotably mounted to the exterior surface of the panel 110. The wiper blade 72 is configured to engage with the window 56 to wipe liquid, debris, and dirt from the surface of the window 56. According to embodiments, the wiper blade 72 is attached to the panel 110 after the panel 110 is formed.

Accordingly, attaching the wiper blade 72 may include drilling an attachment hole into the exterior surface of the panel 110 and attaching the wiper blade 72 thereto with a fastener.

According to embodiments, a wall panel 110″ of the wall assembly 116 includes at least one accessory mounting point 126 and/or an accessory track 128 positioned on an interior surface thereof, that is the surface of the wall assembly 116 that is positioned within the containment construct 112. Such mounting points 126 or tracks 128 may be embedded into the open areas core 12 of the composite sandwich material 10 that forms the wall panel 110″ in order to provide strength to the mounting points 126 or tracks 128. The exact nature and position of the mounting points 126 or tracks 128 are variable and configurable to suit the needs of the user of the particular modular utility vehicle 100. For example, the mounting points 126 or tracks 128 may be configured to hold various tools, equipment of supplies based on the necessary uses of each modular utility vehicle 100.

According to embodiments the wall assembly 116 of the containment construct 112 of the modular utility vehicle 100 includes at least one door panel 110‴ of the plurality of modular panels 110. According to embodiments, the door panel 110‴ is a tailgate, liftgate, hatch door, or pivoting door that is attached to the wall assembly 116 by a plurality of hinges 68. According to embodiments, the door panel 110‴ is or sliding door that moves relative to the wall assembly 116 on a sliding door track system. According to embodiments, the hinges 68 are attached to the interior surface of the door panel 110‴ of the wall assembly 116. According to embodiments, the door panel 110‴ includes a plurality of cutouts that correspond in shape and desired location to the hinges 68. Such cutouts are formed in the composite sandwich material 10 that forms the door panel 110‴ by either cutting the cutouts out from the material of the door panel 110‴ or by forming the cutouts in the door panel 110‴ by molding when the door panel 110‴ is formed. According to embodiments, the cutouts are positioned along a side outer edge of the door panel 110‴, as shown in FIGS. 1-3. In such a case, the door panel 110‴ pivots about the hinges 68 to move an open position. According to embodiments, the hinges 68 are positioned at a lower edge of the door panel 110‴ such that when the door panel 110‴ pivots to the open position, the door panel folds out into a ramp that may be used to move users and items into and out of the containment construct 112 of the modular utility vehicle 100. According to embodiments, the door panel 110‴ includes a safety cable 51 that is configured to be attached between the door panel 110‴ and another portion of the wall assembly 116.

According to embodiments, the safety cable 51 is embedded in the door panel 110‴ at a first end of the safety cable 51 and is attachable at the opposite end of the safety cable 51 to the frame of the wall assembly 116. The safety cable 51 thus connects the door panel 110‴ to another portion of the modular utility vehicle 100 at a point in addition to the hinges 68. Thus, in the event of a crash or failure of the hinges 68, the door panel 110‴ remains connected to the vehicle.

According to embodiments, the door panel 110‴ includes a locking mechanism 64. The locking mechanism 64 is positioned on the interior surface of the door panel 110‴ that is defined by the structural skin 16 of the composite sandwich panel material 10. According to embodiments, the locking mechanism is attached to the door panel 110‴ after the door panel 110‴ is shaped and formed, which may include cutting an opening in the interior surface of the door panel 110‴ that corresponds to the shape and desired location of the locking mechanism 64. The locking mechanism 64 may include a latch and a catch that are configured to cooperate with one another in order to hold the door panel 110‴ in a closed position relative to the wall assembly 116.

According to embodiments, the door panel 110‴ includes a handle 66. The handle 66 is positioned on the exterior surface of the door panel 110‴ that is defined by the high gloss surface sheet 14 of the composite sandwich material 10. According to embodiments, the handle 66 is attached to the door panel 110‴ after the door panel 110‴ is shaped and formed, which may include drilling attachment holes in the exterior surface of the frame that corresponds to the shape and desired location of the handle 66.

According to embodiments, the roof assembly 118 of the containment construct 112 of the modular utility vehicle 100 is formed of at least one roof panel 110⁗ of the plurality of modular panels 110. The roof assembly 110⁗ is positioned horizontally above the chassis 102. According to embodiments, the roof assembly 118 is attached to the wall assembly 116 using a plurality of fasteners. The fasteners may be ordinary fasteners or may utilize hard points 90 as described with reference to FIG. 8. According to embodiments, the roof panel 110⁗ includes a refrigeration unit 130 that is configured to maintain the containment construct 112 at a temperature suitable for frozen or refrigerated goods. According to embodiments, the roof assembly 118 is configured to vertically expand such that uses of the modular utility vehicle 100 are not limited by the height of the containment construct 112.

According to embodiments, the lower surface of the floor panel 110′ is defined by the surface sheet 14 of the composite sandwich material 10 and the oppositely opposed upper surface of said floor panel 110′ is defined by the structural skin 16 of the composite sandwich panel material 10. According to embodiments, the exterior surface of each of the wall panels 110″ or door panels 110‴ is defined by the surface sheet 14 of the composite sandwich material 10 and the oppositely opposed interior surface of each of the side wall panels 110″ or door panels 110‴ is defined by the structural skin 16 of the composite sandwich material 10. As noted above, in embodiments surface sheet 14 of the composite sandwich material 10 is a high gloss surface sheet with a high gloss finish value of 15 with minimal perceptible surface defects suitable for a Class A autobody part. Accordingly, in some embodiments the exterior surface of each of the wall panels 110″ or door panels 110‴ is a high gloss surface sheet 14.

According to embodiments, the upper surface of the floor panel 110′ and the interior surface of each of the wall panels 110″ or door panels 110‴ define a cargo compartment within the vehicle cargo construct 112. Given that these surfaces are defined by the structural skin 16 of the composite sandwich 10, these surfaces that define the cargo compartment are high strength, robust, and resistant to scratches, punctures, and other damage.

According to embodiments, the panels 110 that form the containment construct 112 are integrally formed of a single piece of composite sandwich material 10 or are each formed of a separate piece of composite sandwich material 10. Accordingly, the vehicle containment construct 112 is a single unitary construct that is configured to be attached to a vehicle chassis according to some embodiments. Alternatively, the vehicle containment construct 112 is formed a several separate pieces that are configured to be joined together and to a vehicle chassis. In instances in which the vehicle containment construct 112 is formed of a single piece of composite sandwich material 10, the containment construct 112 is formed by folding the wall panels 110" up from the floor panel 110'. According to embodiments, the folding includes crushing portions of the composite sandwich material 10, particularly the open area core 12 along the fold lines.

According to embodiments, the vehicle containment construct 112 includes a plurality of break lines 88 or corrugations formed in the panels 110. Such break lines 88 provide a predetermined crumple path in the event of an impact so that the composite sandwich material 10 of each part crumples and absorbs impact energy. According to embodiments, the break lines 88 are formed by crushing the open area core 12 of the composite sandwich material 10 in pre-determined locations.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A modular utility vehicle comprising:
   a chassis having a front portion and a rear portion;
   an operator cab fixed to the front portion of said chassis; and
   a plurality of modular panels formed of a composite sandwich material comprising an open area core defining a plurality of pores, a high gloss surface sheet adhered to a first face of the open area core by a first adhesive layer, and a structural skin adhered to a second face of the open area core by a second adhesive layer, with the structural skin wrapped around the open area core and joined to the surface sheet along all edges of the composite sandwich material to fully enclose the open area core and inhibit moisture from entering an interior of the composite sandwich material, said plurality of modular panels forming a containment construct that is fixed to the rear portion of said chassis.

2. The modular utility vehicle of claim 1 wherein the first adhesive layer of said composite sandwich material contacts an interior volume of the open area core.

3. The modular utility vehicle of claim 1 wherein the first adhesive layer of said composite sandwich material and the second adhesive layer of said composite sandwich material each independently are a polyurethane or polyurethane prepolymer.

4. The modular utility vehicle of claim 1 wherein said composite sandwich material further comprises a fill in the pores of the open area core, the fill being at least one of a sound dampening foam, a fire retardant, or a phase change material.

5. The modular utility vehicle of claim 1 wherein the surface sheet of said composite sandwich material is SMC with an average thickness of from 1.5 to 5 mm and the open area core of said composite sandwich material has a pore diameter of 6 to 25 mm.

6. The modular utility vehicle of claim 1 wherein said containment construct comprises a floor assembly comprising at least one floor panel of said plurality of modular panels positioned horizontally along said chassis.

7. The modular utility vehicle of claim 6 wherein said floor assembly includes an extendable ramp.

8. The modular utility vehicle of claim 6 wherein the floor assembly includes a plurality of tie down points.

9. The modular utility vehicle of claim 1 wherein said containment construct comprises a wall assembly comprising a plurality of wall panels of said plurality of modular panels positioned perpendicularly to said chassis.

10. The modular utility vehicle of claim 9 wherein at least one wall panel of said plurality of wall panels has a window positioned therein.

11. The modular utility vehicle of claim 9 wherein at least one wall panel of said plurality of wall panels has at least one accessory mounting point positioned on an interior surface thereof.

12. The modular utility vehicle of claim 9 further comprising at least one door panel of said plurality of modular panels.

13. The modular utility vehicle of claim 12 wherein said at least one door panel folds out to expose a ramp.

14. The modular utility vehicle of claim 1, comprising a roof panel with a refrigeration unit.

15. The modular utility vehicle of claim 1 further comprising a filler is at least one of: glass fiber, carbon fiber, carbon nanotubes, graphene, inorganic particulate fillers, glass microspheres, low profile additives, or moisture scavengers.

16. The modular utility vehicle of claim 1 wherein the second adhesive layer of said composite sandwich material impregnates a cloth positioned between the structural skin and the second face of the open area core.

17. The modular utility vehicle of claim 1 further comprising a partition between the operator cab and the rear portion.

* * * * *